United States Patent [19]  [11] 4,399,037
Diskowski et al. [45] Aug. 16, 1983

[54] PROCESS FOR WORKING UP WASTE WATER CONTAINING PHOSPHORUS

[75] Inventors: Herbert Diskowski, Erfstadt; Johannes Krause, Hürth-Hermülheim; Dietrich Mandelkow, Hürth-Knapsack, all of Fed. Rep. of Germany

[73] Assignee: Hoechst Aktiengesellschaft, Fed. Rep. of Germany

[21] Appl. No.: 308,424

[22] Filed: Oct. 5, 1981

[30] Foreign Application Priority Data

Oct. 10, 1980 [DE] Fed. Rep. of Germany ....... 3038336

[51] Int. Cl.$^3$ ............................................. C02F 1/58
[52] U.S. Cl. ................................... 210/721; 210/781; 210/906
[58] Field of Search ............... 210/906, 907, 714, 716, 210/721, 724, 737, 758, 781

[56] References Cited

U.S. PATENT DOCUMENTS

| | | | |
|---|---|---|---|
| 3,480,144 | 11/1969 | Barth et al. | 210/906 X |
| 3,634,231 | 1/1972 | Dunseth et al. | 210/906 X |
| 3,684,461 | 8/1972 | Muller et al. | 210/906 X |
| 4,257,898 | 3/1981 | Meurer et al. | 210/907 X |

OTHER PUBLICATIONS

Horten et al., *Sewage and Industrial Wastes*, vol. 28, 1956, pp. 70–77.
*Schlackenatlas (Slag Atlas)*, Ed. Verein deutscher Eisenhuettenleute, Verlag Stahleisen m.b.H., Duesseldorf, 1981, p. 106.
*Chemische Technologie*, 3rd Ed., vol. 1, Ed. Winnacker et al., Carl Hanser Verlag, Munich 1980, p. 390.

*Primary Examiner*—Thomas G. Wyse
*Attorney, Agent, or Firm*—Connolly and Hutz

[57] ABSTRACT

The invention relates to a process for working up phosphorus-containing waste water by subjecting it to filtration with the use of a filter aid in a centrifugal filter. To this end, waste water with a temperature of at least 46° C. and a pH-value within the range 0.5 to 4.0 is introduced into the centrifugal filter and fitrate coming from the centrifugal filter is introduced into a calming zone and separated therein within an average period of 10 to 60 minutes into yellow phosphorus and water containing 1 to 30 ppm of phosphorus. Water overflowing from the calming zone is treated with an oxidant and the waste water so freed from phosphorus is reacted with a neutralizing agent.

7 Claims, No Drawings

PROCESS FOR WORKING UP WASTE WATER CONTAINING PHOSPHORUS

The present invention relates to a process for working up phosphorus-containing waste water by subjecting it to filtration with the use of a filter aid in a centrifugal filter.

It is known in the art that phosphorus-containing waste water, which is obtained in the electrothermal production of phosphorus, can be admixed in thickeners with high molecular weight proteins to effect the precipitation of the phosphorus at a pH-value of about 5.8. The phosphorus-containing waste water with a pH-value within the range 1.5 to 2 is partially neutralized by means of soda which is added thereto. Also added is clay which is intended to prevent incrustation, normally originating from silicic acid (cf. "Sewage and Industrial Wastes", volume 28 (1956), pages 70 to 77).

In the process described in DE-PS No. 18 08 541 for the work up of waste water having phosphorus sludge contained therein, lime hydrate is added to the waste water so as to establish a pH-value of 4 to 6. Next, the partially neutralized waste water is filtered in a centrifugal filter with the use of a filter aid.

An adverse effect encountered with the process first referred to hereinabove resides in the use of valuable proteins as a coagulant and in the fact that the phosphorus is separated together with further contaminants in form of a thick sludge of which the work up is very expensive.

The process last referred to suffers from the disadvantage that the entire phosphorus is filtered off together with the further contaminants whereby the work up of the phosphorus-containing filter cake is naturally rendered expensive as it is necessary for the latter to be subjected to distillation so as to be completely freed from phosphorus.

It is therefore object of the present invention to provide a process permitting phosphorus-containing waste water to be worked up by filtration, wherein merely a small proportion of the phosphorus contained in the waste water is retained in the filter residue, which comprises: Introducing the waste water with a temperature of at least 46° C. and a pH-value within the range 0.5 to 4.0 into the centrifugal filter; introducing filtrate coming from the centrifugal filter into a calming zone and separating it therein within an average period of 10 to 60 minutes into yellow phosphorus and water containing 1 to 30 ppm of phosphorus; treating water overflowing from the calming zone with an oxidant; and reacting the waste water so freed from phosphorus with a neutralizing agent.

Preferred features of the present process provide:
(a) for the waste water which is introduced into the centrifugal filter to have a temperature of 50° to 75° C.;
(b) for the waste water to have a temperature of 60° to 70° C.;
(c) for the waste water which is introduced into the centrifugal filter to have a pH-value within the range 2.0 and 3.5;
(d) for air to be used as the oxidant;
(e) for a bleaching liquor to be used as the oxidant;
(f) for calcium metasilicate to be used as the neutralizing agent; and
(g) for phosphorus furnace slag to be used as calcium metasilicate.

As a result of the temperature and pH-value selected in accordance with this invention for the waste water, it is possible for the bulk proportion of phosphorus dispersed therein to run through the centrifugal filter. In addition to this, the centrifugal filter can be operated over commercially acceptable service periods. Kieselguhr is the filter aid which should preferably be used in the process of this invention.

The acid filtrate has yellow phosphorus dispersed in it which in the process of this invention is precipitated without difficulty obviously in view of the fact that hydrolysis products of silicon tetrafluoride which promote the emulsification of phosphorus in the waste water are retained in the filter residue on the centrifugal filter.

As a result of the present process, the waste water coming from the calming zone merely has a few ppm of phosphorus contained therein, which is easy to remove by oxidation.

The filter residue obtained in this invention which contains a certain proportion of elementary phosphorus can be worked up in customary fashion, e.g. by the process described in DE-PS No. 22 28 636.

Waste water containing about 400 mg phosphorus per liter was used in the following Examples.

The filtration was effected in each particular case with the use of a centrifugal filter with a filter surface area of 50 m$^2$. Deposited thereon, prior to filtration, was 40 kg Perlite as a filter aid. The filtration with freshly deposited filter aid was effected at a rate of 60 m$^3$/h; it was discontinued once the rate was found to have dropped to 30 m$^3$/h, and filter cake was removed by centrifugation. The centrifugal filter is serviceable over the period of time which elapses until reduction of the filtration rate initially of 60 m$^3$/h down to 30 m$^3$/h.

The waste water so filtered and extensively freed from phosphorus was always neutralized by means of calcium metasilicate. To this end, 100 m$^3$/h waste water was in each particular case injected into flowing water (2000 m$^3$/h) which had about 1 g/l granulated phosphorus furnace slag suspended therein.

Independently of the pH-value of the waste water, a pH of about 5 was established in the respective mixture of waste water and flowing water.

EXAMPLE 1

(Comparative Example)

Phosphorus-containing waste water which had a pH-value of 5 and a temperature of 60° C. was filtered. The filter was serviceable over a period of 2 hours. The filtered waste water which contained 240 mg/l phosphorus was allowed to remain over 60 minutes in a settling vessel. Supernatant water, above the phosphorus, contained less than 1 mg/l phosphorus and was neutralized.

EXAMPLE 2

(Comparative Example)

Waste water with a pH-value of 2 to 3 and a temperature of 47° C. was filtered. The filter was serviceable over a period of 3 hours. The filtered waste water which contained 40 mg/l phosphorus was allowed to remain over 30 minutes in a settling vessel. The supernatant water, above the phosphorus, was then found to contain 20 mg/l phosphorus. By the addition of 200 l/h bleaching liquor (with about 14% NaOCl) to 50 m$^3$/h of this waste water, the phosphorus content was reduced down to less than 1 mg/l. Next, the water was neutralized.

EXAMPLE 3

(Invention)

Waste water with a pH-value of 2 to 3 and a temperature of 55° C. was filtered. The filter was serviceable for 8 hours. The filtered waste water which contained 290 mg/l phosphorus was allowed to remain for 30 minutes in a settling vessel. The supernatant water, above the phosphorus, was then found to contain 25 mg/l phosphorus. By the addition of 200 l/h bleaching liquor (about 14% NaOCl) to 50 m³/h of this water, the phosphorus content was reduced down to less than 1 mg/l. Next, the water was neutralized.

EXAMPLE 4

(Invention)

Waste water with a pH-value of 2 to 3 and a temperature of 60° C. was filtered. The filter was serviceable over a period of 8 hours. The filtered water contained 330 mg/l phosphorus. It was worked up as described in Example 3.

EXAMPLE 5

(Invention)

Waste water with a pH-value of 2 to 3 and a temperature of 70° C. was filtered. The filter was serviceable for 8 hours. The filtered waste water, which contained 350 mg/l phosphorus, was allowed to remain for 60 minutes in a settling vessel. The supernatant water, above the phosphorus, was then found to contain less than 1 mg/l phosphorus. It was neutralized.

EXAMPLE 6

(Invention)

Waste water with a pH-value of 1.5 and a temperature of 60° C. was filtered. The filter was serviceable for 8 hours. The filtered water contained 350 mg/l phosphorus. It was worked up as described in Example 5.

We claim:

1. A process for working up phosphorus-containing waste water obtained in the electrothermal production of phosphorus by subjecting it to filtration with the use of a filter aid in a centrifugal filter, which comprises: introducing the waste water with a temperature of at least 46° C. and a pH-value of at least 0.5 but less than 4.0 into the centrifugal filter; introducing filtrate coming from the centrifugal filter into a calming zone and separating it therein with an average period of 10 to 60 minutes into yellow phosphorus and water containing 1 to 30 ppm of phosphorus; treating water overflowing from the calming zone with an oxidant; and neutralizing the waste water so freed from phosphorus with calcium metasilicate.

2. A process as claimed in claim 1, wherein the waste water introduced into the centrifugal filter has a temperature of 50° to 75° C.

3. A process as claimed in claim 2, wherein the waste water has a temperature of 60° to 70° C.

4. A process as claimed in claim 1, wherein the waste water introduced into the centrifugal filter has a pH-value within the range 2.0 and 3.5.

5. A process as claimed in claim 1, wherein air is used as the oxidant.

6. A process as claimed in claim 1, wherein a bleaching liquor is used as the oxidant.

7. A process as claimed in claim 1, wherein phosphorus furnace slag is used as calcium metasilicate.

* * * * *